United States Patent
Aizawa et al.

[11] Patent Number: 5,110,218
[45] Date of Patent: May 5, 1992

[54] PREDICTION METHOD FOR FORMATION OF HEAT STREAK AND THERMAL SENSOR ROLL THEREFOR

[75] Inventors: Atsushi Aizawa; Yoshinori Matsumoto; Kenji Hara; Toshiro Yamada, all of Osaka, Japan

[73] Assignee: Nisshin Steel Co., Ltd., Tokyo, Japan

[21] Appl. No.: 666,812

[22] Filed: Mar. 8, 1991

[30] Foreign Application Priority Data

Mar. 27, 1990 [JP] Japan .................................. 2-78217

[51] Int. Cl.⁵ .............................................. G01B 13/08
[52] U.S. Cl. ..................................... 374/153; 374/179
[58] Field of Search ................ 374/169, 153, 120, 179

[56] References Cited

U.S. PATENT DOCUMENTS

| | | | |
|---|---|---|---|
| 3,285,069 | 11/1966 | Weiss | 374/153 X |
| 4,046,009 | 9/1977 | Sauer | 374/153 X |
| 4,408,903 | 10/1983 | Baldasarri | 374/153 X |
| 4,441,827 | 4/1984 | Coderre | 374/153 |
| 4,878,184 | 10/1989 | Okada et al. | 374/169 X |
| 5,015,102 | 5/1991 | Yamaguchi | 374/169 |

FOREIGN PATENT DOCUMENTS

| | | | |
|---|---|---|---|
| 815856 | 10/1951 | Fed. Rep. of Germany | 374/153 |
| 2428890 | 6/1974 | Fed. Rep. of Germany | 374/153 |
| 62-199209 | 9/1987 | Japan . | |

*Primary Examiner*—Daniel M. Yasich
*Attorney, Agent, or Firm*—Armstrong, Nikaido, Marmelstein, Kubovcik & Murray

[57] ABSTRACT

A plurality of thermocouples are embedded close to each other with individually different depth in a temperature detecting block. One or more of the temperature detecting block are attached to the surface of a thermal sensor roll. When the thermal sensor roll is held in contact with a metal strip being rolled, temperatures in the thermal sensor roll are measured at a plurality of points. The temperature of the metal strip in contact with the surface of the thermal sensor roll is calculated from the graduation of a temperature in the thermal sensor roll along a direction vertical to the surface of the thermal sensor roll, without the influence of disturbances. The obtained temperature value of the metal strip being rolled is compared with an experimentally obtained temperature of heat streak formation, to predict the formation of heat streaks with high accuracy.

4 Claims, 2 Drawing Sheets

PREDICTION METHOD FOR FORMATION OF HEAT STREAK AND THERMAL SENSOR ROLL THEREFOR

BACKGROUND OF THE PRESENT INVENTION

The present invention relates to a method of predicting the formation of heat streaks on a metal strip such as a steel strip being cold rolled, and a thermal sensor roll to be used for the prediction method.

During cold rolling a metal strip such as a steel strip, the metal strip is likely burnt onto the surface of a work roll. The burning causes the formation of surface defects, i.e. so-called heat streak, on the surafce of the metal strip to be rolled. The surface of the work roll is also damaged by the burning. The damaged surface pattern of the work roll is transcribed onto the surface part of a succeeding metal strip.

The formation of heat streaks is substantially derived from burning caused by the destruction of oil film. For instance, in case where a metal strip is cold rolled with a high ratio of reduction or at a high rolling speed under the condition that luburication by oil film is poor or that a coolant provides too small of a cooling function, the temperature of the metal strip rises due to heat caused by friction between the metal strip and the work roll, the plastic deformation of the metal strip, the shortage of the luburicant oil, etc. Consequently, the pressure and/or temperature of the oil film in a roll bite rises, resulting in the destruction of the oil film which promotes the burning between the work roll and the metal strip to be rolled.

The formation of heat streaks causes various kinds of bad influences, such as the deterioration of the surface property of a rolled product, the reduction of yield ratio and the lowering of work efficiency. In this regard, it is necessary to control the temperature of the metal strip being rolled, just below the roll bite during cold rolling, under a predetermined value.

However, there has not been proposed so far a proper sensor for detecting the temperature of a metal strip in order to prevent heat streaks from occuring. On the actual stage, rolling conditions such as reduction ratio and rolling speed are preset in a safety range referring to experimental prediction, to perform cold rolling without the formation of heat streaks. Consequently, rolling operation using the capacity of a rolling mill to the maximum extent is not done, resulting in the lowering of efficiency of production.

There is proposed a method of directly detecting the temperature of a metal strip being rolled using a infrared radiation thermometer disposed at the exit part of a rolling mill, by Japanese Patent Application Laid-Open 62-199209. In this method, the radiation thermometer using infrared beams as the measuring range of wave length is received in a cylindrical vessel, and a light shielding plate and an air supply nozzle are disposed at the opened side of the cylindrical vessel. Compressed air is injected through the air supply nozzle onto the surface of the metal strip, so as to purge the vapor of rolling oil from the surface of the metal strip. Thus, the temperature of the metal strip is detected in non-contact state.

However, the atmosphere where the temperature of the metal strip is detected by the infrared radiation thermometer is generally contaminated with the vapor of rolling oil and so on. The surface of the metal strip is covered with the film of the rolling oil. In this situation, the radiation ratio from the surface of the metal strip is widely varied according to the conditions. In addition, the radiation ratio is also changed in response to the kind of metal strip to be rolled and the degree of acid pickling. These conditions affect as disturbance factors on detected values and lowers the reliability of detection. Besides, it is impossible to preset the radiation ratio under a constant condition. On the other hand, it is difficult to obtain the change pattern of the radaition ratio corresponding to the actual temperature of the metal strip. As a result, the detected value of the temperature of the metal strip with high accuracy is not expected, so that the formation of heat streaks can not be predicted with high reliablity.

SUMMARY OF THE PRESENT INVENTION

An object of the present invention is to detect the temperature of a metal strip being rolled just below the bite of a work roll under a stable condition without any influences such as disturbances.

Another object of the present invention is to improve the accuracy of predicting the formation of heat streaks referring to the detected temperature.

Still another object of the present invention is to detect the temperature of the metal strip being rolled with high accuracy using a plurality of thermocouples each embedded with different depth in a thermal sensor roll which comes in contact with the metal strip to be rolled.

According to the present invention, there is provided a method of predicting the formation of heat streaks, wherein a temperature detecting block in which a plurality of thermocouples are embedded in a state close to each other with individually different depth from the surface is attached to a thermal sensor roll, the thermal sensor roll is disposed in contact with a metal strip to be rolled, a temperature of the metal strip just below the bite of a work roll is calculated based on temperature data obtained by the thermocouples, and the calculated value of the temperature of the metal strip is compared with the estimated temperature of heat streak formation previously obtained from rolling ratio and rolling speed at the time of detecting the temperature.

There is also provided a thermal sensor roll to be used for the predicting method. The thermal sensor roll has a temperature detecting block in which a plurality of thermocouples are embedded in a state close to each other. The depth of each thermocouple from the surface of the temperature detecting block is individually different.

A plurality of thermocouples to be embedded in the temperature detecting block are favorably located in the shortest-possible distance along both of the axial and circumferential directions of the thermal sensor roll. A plurality of the same temperature detecting blocks may be attached to the surface of the sensor roll along the axial direction and/or the circumferential direction.

We, the inventors, have investigated and experimented on how to detect the temperature of a metal strip being rolled with high accuracy, and developed a new system to calculate the temperature of a metal strip being rolled just below the bite of a work roll using a sensor roll equipped with a temperature detecting block in which a plurality of thermocouples are embedded in a state close to each other to the possible extent, while the depth of each of the embedded thermocouples from the surface of the temperature detecting block is individually different from the other.

Temperature data obtained by the thermocouples embedded with individually different depth include various influences derived from heat transfer on the surface of the thermal sensor roll, heat transmission from the metal strip being rolled to the thermal sensor roll and heat transmission inside the thermal sensor roll. In this regard, the temperature of the metal strip can be calculated from thermal graduation and its chronological change based on internal temperature data of the thermal sensor roll. The temperature value of the metal strip obtained in this way has a high reliability hardly affected by disturbance factors different from the measuring method using an infrared radiation thermometer.

Heat streaks are likely formed, when the temperature of the metal strip exceeds a temperature of heat streak formation which has an intimate relationship with rolling ratio, rolling speed and so on. The temperature of heat streak formation can be experimentally obtained as a function including the rolling ratio, rolling speed and so on.

In this consequence, the formation of heat streaks can be predicted with high accuracy, by comparing the calculated value representing the temperature of the metal strip obtained by the thermal sensor roll with the temperature level of heat streak formation. The other objects and features of the present invention will be apparent from the following description with reference to the drawings attached.

DETAILED DESCRIPTION OF THE PREFERRED EMBODIMENT

Figure 1:
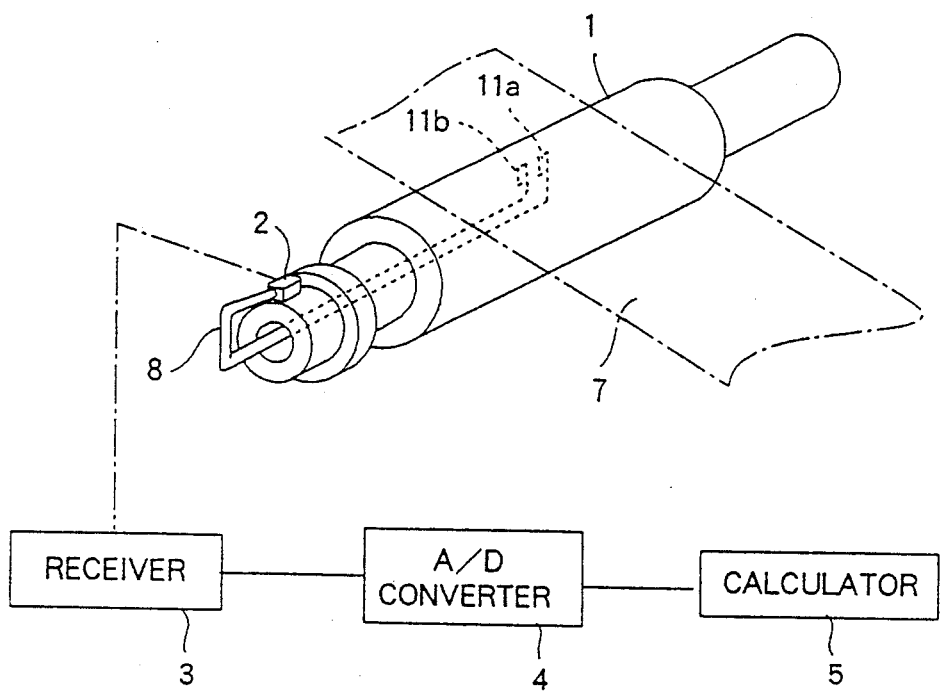
FIG. 1 is a block diagram illustrating a system for calculating the temperature of a metal strip according to the present invention.

The system for calculating the temperature of a metal strip according to the present invention comprises a thermal sensor roll 1, a transmitter 2, a receiver 3, an A/D converter 4 and a calculator 5, as shown in FIG. 1. Temperatures inside the thermal sensor roll 1 are detected by thermocouples 11a, 11b and converted to FM waves by the transmitter. The FM waves are then transmitted from the transmitter 2 to the receiver 3. The temperature signals received by the receiver 3 are then converted into digital data by the A/D converter 4 and input to the calculator 5.

Figure 3:
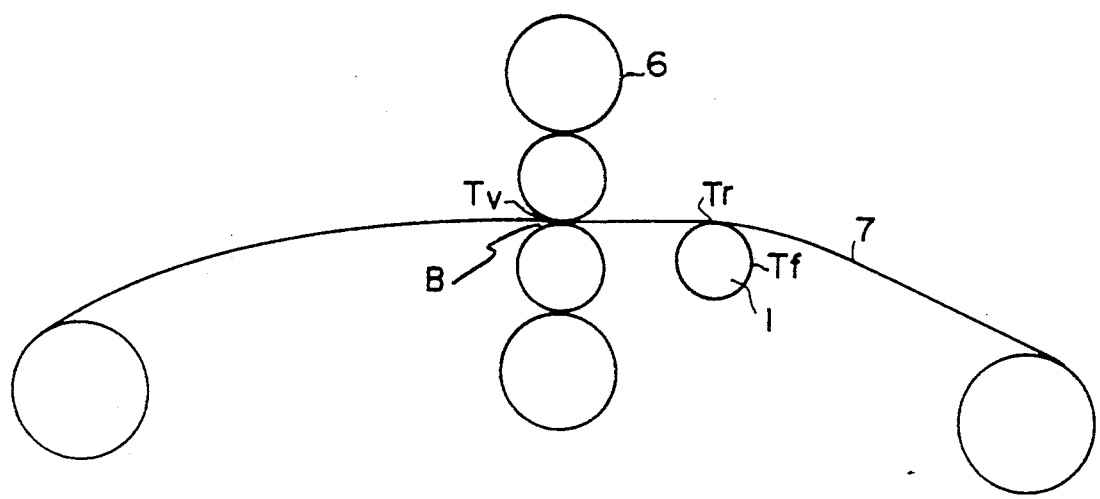
FIG. 3 is an outline view showing a rolling mill in which the thermal sensor roll is incorporated.

In the calculator 5, a temperature Tv of a metal strip 7 being rolled just below the bite B of a work roll (see FIG. 3) is calculated based on the input data. The temperature Tv is compared with a temperature Ts of heat streak formation estimated based on the rolling ratio, rolling speed, etc. at the time of measuring.

In case where the temperature Tv of the metal strip is higher than the temperature Ts of heat streak formation, it is recognized that the formation of heat streak is predicted. According to the recognition, a proper alarm signal such as flashing of an alarm lamp or an alarm buzzer is output. The situation that the temperature Tv of the metal strip rises so high speed that the temperature Tv of the metal strip will exceed the temperature Ts of heat streaks formation in a few minutes, there is also considered the state that the formation of heat streaks is predicted, and the same alarm signal is outputted from the calculator 5, too.

Figure 2:
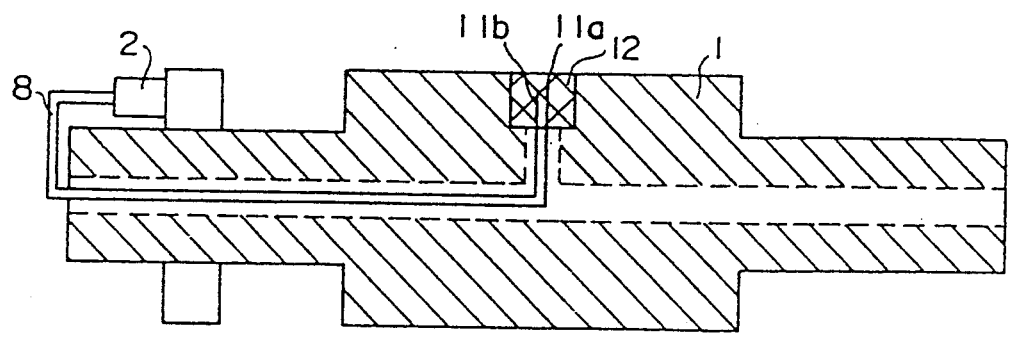
FIG. 2 is a sectional view of a thermal sensor roll.

The thermal sensor roll 1 as shown in FIG. 2 is equipped with a temperature detecting block 12 in which a plurality of thermocouples 11a, 11b are embedded. The detecting terminal of the thermocouple 11a is located at a position shallower from the periphery of the thermal sensor roll 1 than that of the detecting terminal of the other thermocouple 11b. These thermocouples 11a, 11b are disposed close to each other to the possible extent along both of the axial direction and the circumferential direction of the thermal sensor roll 1.

A plurality of the same temperature detecting blocks 12 equipped with those thermocouples 11a, 11b may be arranged along the axial direction of the thermal sensor roll 1. In case where a plurality of the temperature detecting blocks 12 are disposed, it is possible to calculate the distribution of the temperature along the cross direction of the metal strip 7 being rolled just below the bite of the work roll.

A plurality of the same temperature detecting blocks 12 may be arranged along the circumferential direction of the thermal sensor roll 1. Due to the circumferential arrangement of a plurality of the temperature detecting blocks 12, it is possible to detect the temperature of the metal strip 7 being rolled at a plurality of measuring points every one rotation of the sensor roll 1.

Temperature data obtained by the thermocouples 11a, 11b are fed through a compensating lead 8 to the transmitter 2 attached to the side surface of the thermal sensor roll 1.

The calculation of the temperature Tv of the metal strip 7 being rolled just below the bite of the work roll based on the internal temperature data of the thermal sensor roll 1 is performed in the manner undermentioned.

Providing that temperatures at two points with depths $x_1$ and $x_2$ ($x_1 < x_2$) from the surface of the thermal sensor roll 1 are $T_1$ and $T_2$, respectively, thermal transmission along a straight line passing through the two points and a extrapolation point on the surface of the temperature detecting block 12 is calculated as follows:

A temperature Tf of the surface of the thermal sensor roll 1 and a heat flux q on the surface of the thermal sensor roll 1 are represented by the undermentioned formulas (1) and (2), respectively.

$$Tf = AT_1 + BT_2 + CT'_1 + DT'_2 \qquad (1)$$

$$q = ET_1 + FT_2 + GT'_1 + HT'_2 \qquad (2)$$

Wherein, $T'_1$ and $T'_2$ are primary derivatives $dT_1/dt$ and $dT_2/dt$, respectively, of the temperatures $T_1$ and $T_2$ by the time t, and constants A~H are values predetermined by the depths $x_1$, $x_2$ and the material of the temperature detecting block 12.

A temperature Tr of the metal strip 7 being rolled in contact with the thermal sensor roll is represented by the formula (3), presuming that thermal transmissibility between the metal strip 7 being rolled and the thermal sensor roll 1 is $a_1$.

$$Tr = Tf + q/a_1 \qquad (3)$$

The temperature Tv of the metal strip 7 being rolled just below the bite of the work roll is represented by the formulas (4) and (5), wherein $a_2$ is a thermal transmissibility between the metal strip 7 and the coolant or atmosphere, Tc, is a temperature of a coolant or an external atmosphere h is a, thickness of the metal strip 7 being rolled, $\rho_s$ is the density of the metal strip 7 being rolled, $c_s$ is the specific heat of the metal strip 7 being rolled, and t is a time required for the metal strip 7 passing through the position just below the bite of the work roll to the thermal sensor roll 1.

$$Tv = (Tr - Tc) \times \exp(K) + Tc \quad (4)$$

$$K = 2 \times a_2 \times t / (\rho_s \times c_s \times h) \quad (5)$$

Using these formulas (1)~(5), the temperature Tv of the metal strip 7 being rolled just below the bite of the work roll of the rolling mill 6 is calculated in response to the temperatures $T_1$ and $T_2$ at two points in the thermal sensor roll 1, taking into consideration the graduation of a temperature in the thermal sensor roll along a direction vertical to the surface of the thermal sensor roll.

Three or more thermocouples may be embedded in one temperature detecting block 12. Hereby, measuring points in the temperature detecting block 12 are 3 or more. Temperatures at two measuring points optionally selected from these three or more measuring points are detected, the temperature Tv of the metal strip being rolled just below the bite of the work roll is calculated in the same manner as aforementioned, and the calculation is repeated several times. The averaged value of the calculation results is considered as the temperature Tv of the metal strip 7 being rolled. Thereby, the accuracy of calculation is enhanced.

According to the present invention as aforementioned, the temperature Tv of the metal strip 7 being rolled just below the bite of the work roll of the rolling mill 6 is continuously obtained by the calculation using the aforementioned formulas, and compared with the temperature Ts of heat streak formation predicted from the reduction ratio, rolling speed and so on at the time of measuring. Herein, the obtained data on the temperature Tv is stable without the influence of disturbances such as the change of a rolling atmosphere or oil film, so that the comparison of the temperature Tv with the temperature Ts is performed with high accuracy. Thereby, the formation of heat streaks can be predicted. An operation to inhibit the formation of heat streaks in advance, e.g. immediately lowering rolling speed or intensifying the cooling power of coolant, is adopted taking into consideration the prediction. Consequently, rolling operation using the capacity of the rolling mill 6 to the maximum extent can be performed under the rolling condition very close to the situation of heat streak formation. Thus, a rolled product excellent in surface appearance free from the formation of heat streak is obtained with enhanced productivity.

The thermal sensor roll having the constitution shown in FIG. 2 may be used in various technical fields other than the calculation of the temperature of the metal strip during rolling. For instance, when a plurality of the temperature sensor rolls are arranged along a pass line in a heat treating furnace, the temperature of the material in the furnace can be controlled with high accuracy.

EXAMPLE

In this example, a four-high rolling mill 6 was used. The rolling mill 6 was equipped with a temperature detecting block 12. Thermocouples 11a and 11b were embedded in the temperature detecting block 12 with depths 0.3 mm and 0.8 mm, respectively, from the surface of the thermal sensor roll 1. The thermal sensor roll 1 equipped with the temperature detecting block 12 was disposed at the exit side of the rolling mill 6. Austenitic stainless steel as a metal strip 7 was rolled with a reduction ratio of 30% at a rolling speed of 600 m/min. The temperature Ts of heat streak formation under these conditions was experimentally 170° C.

Figure 4:
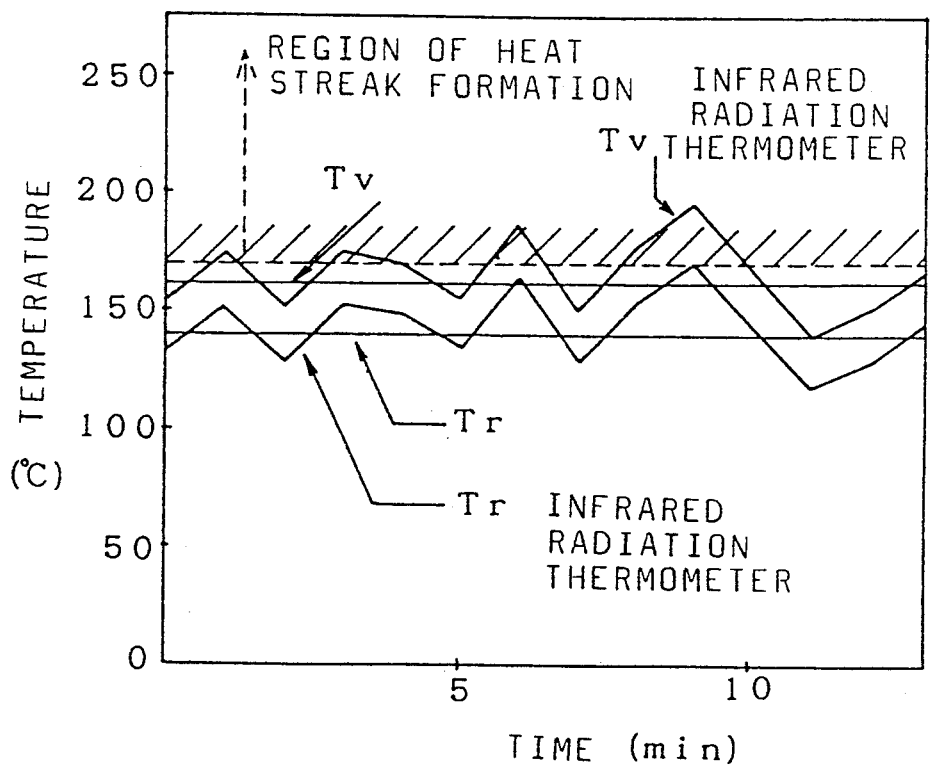
FIG. 4 is a diagram defining the advantage of the present invention in comparison with a conventional method.

A temperature Tr of the metal strip 7 being rolled in contact with the thermal sensor roll 1 and a temperature Tv of the metal strip 7 just below the bite of the work roll were detected by the method according to the present invention. The changes of these temperatures Tr, Tv are shown in FIG. 4. For comparison, values of temperatures Tr and Tv of the metal strip 7 detected using an infrared radiation thermometer are also shown in FIG. 4.

It is noted from FIG. 4 that the temperatures Tr, Tv obtained using the infrared radiation thermometer were irregularly changed within the dispersion of ±30° C. This deviation is probably caused by such disturbance that the change of a rolling atmosphere affects the values detected by the infrared radiation thermometer. It was difficult to predict the formation of heat streaks based on such irregularly changing temperatures Tv of the metal strip. Besides, the prediction on the formation of heat streaks was of poor accuracy and lack of reliability.

On the other hand, the temperature Tv of the metal strip being rolled just below the bite of the work roll detected according to the present invention was stable about 160° C. Hence, proper information that the temperature Tv of the metal strip 7 being rolled just below the bite of the work roll was lower than the temperature Ts of heat streak formation was obtained with high reliability, by comparing said temperature Tv with the temperature Ts (=170° C.) of heat streak formation which was experimentally previously confirmed. Referring to the information, rolling operation was continued under the same rolling condition. Thereby, a cold rolled stainless steel strip excellent in surface appearance free from the formation of heat streaks was produced.

What is claimed is:

1. A method of predicting formation of heat streaks, comprising the steps of:

attaching at least one temperature detecting block to a thermal sensor roller, said temperature detecting block including a plurality of thermocouples embedded close to each other with individually different depth from a surface of said thermal sensor roll;

disposing said thermal sensor roll at a position in contact with a metal strip to be rolled and downstream from a work roll;

detecting temperatures of inner parts of said thermal sensor roll with said thermocouples;

transmitting detected temperatures from said thermocouples as electromagnetic waves;

receiving the electromagnetic waves;

calculating a temperature of the metal strip being rolled based on the received electromagnetic waves; and comparing the calculated temperature with a predetermined temperature of heat streak formation which is based on a reduction ratio and a rolling speed at a time of detecting the temperature.

2. A thermal sensor roll comprising:

a roll;

at least one temperature detecting block on said roll;

a plurality of thermocouples embedded close to each other with individually different depths from a surface of the temperature detecting block for detecting a temperature of the roll; and a transmitter mounted on the roll for transmitting electromechanical waves to means for determining the internal temperature of said roll dependent on the detected temperature.

3. A thermal sensor roll according to claim 2 wherein said plurality of thermocouples are arranged along an axial direction of the roll.

4. A thermal sensor roll according to claim 2 wherein said plurality of thermocouples are arranged along a circumferential direction of the roll.

* * * * *